(12) United States Patent
Fritz et al.

(10) Patent No.: US 11,725,697 B2
(45) Date of Patent: Aug. 15, 2023

(54) BEARING CAGE SEGMENT CONFIGURED FOR USE WITH AN INSTALLATION TOOL

(71) Applicant: AKTIEBOLAGET SKF, Gothenburg (SE)

(72) Inventors: Dominik Fritz, Würzburg (DE); Michael Reugels, Knetzgau (DE)

(73) Assignee: AKTIEBOLAGET SKF, Gothenburg (SE)

( * ) Notice: Subject to any disclaimer, the term of this patent is extended or adjusted under 35 U.S.C. 154(b) by 54 days.

(21) Appl. No.: 17/381,457

(22) Filed: Jul. 21, 2021

(65) Prior Publication Data

US 2021/0381553 A1 Dec. 9, 2021

Related U.S. Application Data

(62) Division of application No. 17/030,630, filed on Sep. 24, 2020, now Pat. No. 11,098,763.

(30) Foreign Application Priority Data

Sep. 30, 2019 (DE) .......................... 102019214953.7

(51) Int. Cl.
*F16C 33/50* (2006.01)
*F16C 43/04* (2006.01)
*B23P 15/00* (2006.01)
*F16C 33/46* (2006.01)

(52) U.S. Cl.
CPC ............ *F16C 43/04* (2013.01); *B23P 15/003* (2013.01); *F16C 33/4676* (2013.01); *F16C 33/502* (2013.01)

(58) Field of Classification Search
CPC .. F16C 33/4676; F16C 33/502; F16C 41/045; F16C 43/04
See application file for complete search history.

(56) References Cited

U.S. PATENT DOCUMENTS

| 3,696,490 | A | 10/1972 | Secunda |
| 3,782,795 | A * | 1/1974 | Richey .................. F16C 33/526 384/463 |
| 7,721,419 | B2 | 5/2010 | Leimann |
| 8,713,800 | B2 | 5/2014 | Friedl |

(Continued)

FOREIGN PATENT DOCUMENTS

| DE | 102014205190 A1 | 9/2015 | |
| DE | 102014208235 A1 * | 11/2015 | ............ F16C 41/045 |

(Continued)

OTHER PUBLICATIONS

European Search Report from the European Patent Office dated Nov. 30, 2020 in related application No. EP 20196127.3, including European Search Opinion.

*Primary Examiner* — Phillip A Johnson
(74) *Attorney, Agent, or Firm* — J-Tek Law PLLC; Scott T. Wakeman; Mark A. Ussai

(57) ABSTRACT

A cage segment for a rolling-element bearing having a plurality of rolling elements includes at least one bridge and first and second plates extending from axial ends of the bridge, sides of the bridge being configured to guide rolling elements. Radially inner or outer edges of each of the bridges include at least one axial channel having channel walls projecting radially and circumferentially from the radial inner or outer edge.

19 Claims, 5 Drawing Sheets

(56) References Cited

U.S. PATENT DOCUMENTS

| | | | |
|---|---|---|---|
| 10,704,603 B2 | 7/2020 | Maruyama et al. | |
| 2009/0208161 A1* | 8/2009 | Jauernig | F16C 33/4635 |
| | | | 384/572 |
| 2012/0263408 A1* | 10/2012 | Yamada | F16C 33/605 |
| | | | 29/898.04 |
| 2017/0198752 A1* | 7/2017 | Hofmann | F16C 33/4611 |
| 2017/0307016 A1* | 10/2017 | Friedrich | F16C 43/06 |

FOREIGN PATENT DOCUMENTS

| | | | | |
|---|---|---|---|---|
| JP | 2005069282 A | * | 3/2005 | ......... F16C 33/4635 |
| JP | 2012052559 A | * | 3/2012 | ......... F16C 33/4635 |
| JP | 2014020507 A | | 2/2014 | |
| WO | 2015108132 A1 | | 7/2015 | |

* cited by examiner

BEARING CAGE SEGMENT CONFIGURED FOR USE WITH AN INSTALLATION TOOL

CROSS-REFERENCE

This application is a divisional of U.S. Ser. No. 17/030,630 filed Sep. 25, 2020, which claims priority to German patent application no. 10 2019 214 953.7 filed on Sep. 30, 2019, the contents of which are fully incorporated herein by reference.

TECHNOLOGICAL FIELD

The present invention relates to an installation tool for installing rolling elements and a bearing ring and to a bearing cage segment configured to be used with the installation tool.

BACKGROUND

For tapered roller bearing assemblies in turbines, for example, for supporting a main shaft of a wind turbine, tapered roller bearings including one-part cages are currently used. In turbine applications wherein the tapered roller bearings are used in a back-to-back arrangement and have a diameter of a plurality of meters, due to the size of the turbines it is not possible to rotate the turbines to install the second tapered roller set of the back-to-back arrangement. The tapered roller bearing that is above in the final assembly has therefore, up to now, been provided with a cage such that the outer ring can first be installed, and subsequently the inner ring, including the rolling elements that are held by the cage, can be inserted downward by the narrow diameter. However, with this inverted installation the use of one-part bearing cages is essential, since without such a bearing cage, or with bearing cages that are comprised of individual gage segments, the rolling elements would fall out during the installation.

The one-part cages ensure a self-retaining function of the tapered rollers during the installation and thus allow an inner ring including a tapered roller set to be installed in an inverted position. However, these solid cages are very expensive to manufacture and often require additional elements on the bearing inner ring, such as, for example, a specific surface topography of the guide surfaces, which causes additional costs. Furthermore, the guiding of a cage on the inner ring or the tapered rollers can be subjected to a sliding contact that can increase the wear of the bearing.

SUMMARY

It is therefore an aspect of the present disclosure to provide a possibility to use bearings including cage segments for such a turbine application.

The installation tool for installing a bearing ring including rolling elements includes a ring that is configured to be disposed on a lateral surface of the bearing ring. The bearing ring can be a bearing inner ring or a bearing outer ring. The ring of the installation tool can be configured one-piece or segmented.

The installation tool furthermore includes slider elements that are distributed uniformly around the ring. The ring includes receptacles for the slider elements. Here the slider elements can be displaced in an axial direction with respect to the ring and/or a radial direction relative to the ring. The number of the slider elements can be the same as the number of rolling elements. Alternatively, fewer slider elements than rolling elements can also be provided. In both cases, all or only a part of the slider elements, for example, every second one, can be displaced into the end position.

The receptacles can be produced in any manner, for example, as through-openings such as bores, milled holes, or by other production methods. From a starting position, into which the installation tool can be moved and in which the slider elements are not displaced relative to the ring, the slider elements can be displaced into an end position, wherein the slider elements are completely shifted into the end position relative to the ring, for example, completely pushed through through-openings. The slider elements can each be comprised of a profiled, preferably tubular, section or a pin that can be pushed through the through-opening.

A bearing is usually delivered with the outer and inner ring fitted and rolling elements and cage segments disposed therebetween. In order to install the bearing, the installation tool is placed on the bearing ring (in particular the large diameter of an inner ring) and the slider elements are moved into their end position. With the installation tool, the bearing ring can now be lifted out from the bearing with the rolling elements and the cage segments, and the two bearing rings can be installed separately from each other.

Alternatively the installation tool can be placed on the bearing ring (in particular the large diameter of an inner ring) and the bearing ring can be individually loaded with a combination of rolling elements and cage segments, and the slider elements can be displaced little by little into their final position.

Each rolling element can be equipped with a single cage segment, or a cage segment can be provided for a plurality of rolling elements or every second rolling element can be preferably disposed in a pocket of a cage segment, wherein walls or bridges of the cage segment are each disposed between two rolling elements. Furthermore, the cage segments can be configured as spacers between the rolling elements.

In these cases, an assembly of the bearing ring, including the rolling elements, and the cage segments is formed by the installation tool, which assembly can be moved as a whole, in particular placed on a hub unit, without the rolling elements falling downward from the bearing ring. For this purpose the slider elements are configured to each be disposed in the end position between two rolling elements and a contact surface of a wall of a cage segment, which wall is disposed between the two rolling elements. Due to this arrangement of the slider elements a radial mobility of the rolling elements with respect to the bearing ring can be limited. Here the slider elements assume the function of a bearing cage, so that the rolling elements are secured between the slider elements and the bearing ring. The use of a one-part bearing cage can thus be omitted. Instead, individual cage segments can be used, into which the slider elements engage. Such cage segments can each receive one or even a plurality of rolling elements. Furthermore, the cage segments can be configured as spacers, between the rolling elements, that do not completely enclose the rollers.

In this way a compact module can be formed from the bearing ring, including the rolling elements and the cage segments, as well as the installation tool. This module can then be inserted as a whole, for example, into an outer ring. The module made of the bearing ring, rolling elements, cage segments, and installation tool can then be inserted into a bearing assembly, or also removed again therefrom.

If the bearing ring is the bearing inner ring, according to one embodiment the slider elements are disposed, in their end position, in the free space radially outside the pitch circle diameter between two rolling elements, the contact surface of the cage segment, and the raceway of the outer ring. Alternatively, the bearing ring can be the outer ring, wherein the slider elements are then disposed, in their end position, in the free space radially inside the pitch circle diameter between two rolling elements, the contact surface of the cage segment, and the raceway of the inner ring. Due to this arrangement it can be ensured that the rolling elements cannot be removed from the inner ring or the outer ring.

According to a further embodiment, the slider elements are displaceable angularly with respect to the ring surface. In this case, in their end position the slider elements form a truncated cone shape, wherein this truncated cone shape is oriented towards the truncated cone shape that is formed by the roller axes. The diameter of the circle that is formed by the slider elements in their initial position is thus larger than the diameter of the circle that is formed by the slider elements in their end position, or vice versa.

According to a further embodiment, the installation tool includes a centering element in order to center the ring on the outer diameter of a guide flange of the bearing ring. Due to the centering element an exact radial position of the installation tool with respect to the bearing ring can thus be ensured.

According to a further embodiment the installation tool includes an attachment element in order to attach the ring to the bearing ring. Such an attachment means can be configured, for example, as a clamping or screw device. Due to such an attachment means a securing of the installation tool to the bearing ring can be ensured. Furthermore, the ring can be attached to the bearing ring in a rotating manner. For this purpose rollers can be provided, for example, that make possible a rotation of the ring with respect to the bearing ring.

According to a further embodiment the installation tool includes a spacing means for adjusting an axial spacing between the ring and the bearing ring, and/or a spacing means for adjusting a radial spacing between the slider elements and the raceways of the rolling elements. The spacing means can be configured, for example, as adjustable spacing means, so that the axial spacing between the ring and the bearing ring and/or the radial spacing between the slider elements and the raceway of the rolling elements is variably adjusted. In this way the installation tool can be used for various sizes of rolling elements.

According to a further embodiment the installation tool includes a retaining element in order to hold the slider elements in their initial position and/or end position and/or in one or more intermediate positions. Such a retaining means can be configured as a locking element. For example, the retaining element can be a pin or lever that can be moved via a retaining plate of the slider elements in order to hold the slider elements in their upper or lower, i.e., initial or end position. Alternatively the retaining means can be a clamping device, screw device, or the like. The retaining means can be configured, for example, as a spring-loaded bolt. Due to such a retaining means it can be ensured that the slider elements are not displaced unintentionally from their initial position into their end position, or vice versa.

According to a further embodiment the ring is manufactured from a metal and/or the slider elements are manufactured from a plastic or a metal. If the slider elements are produced from a plastic, they can be slightly elastic, whereby a further adapting to the rolling elements or to a radial clearance or circumferential clearance of the rolling elements is possible.

According to a further aspect, a cage segment for a rolling-element bearing is disclosed, wherein the cage segment includes at least one bridge or a plurality of bridges connected via connection plates, wherein the bridge/the bridges includes at least one guide surface for guiding the rolling elements in the installed rolling-element bearing. Here in the installed rolling-element bearing the rolling elements are in contact with the guide surfaces, or are spaced from them by a small spacing. The cage segment preferably includes two bridges, wherein a pocket is formed between the two bridges, in which pocket a rolling element can be received. With the use of such a cage segment, every second rolling element is received in a pocket. Alternatively the cage segment can be a pure spacer that is disposed between two rolling elements.

In order to make possible an interaction of the cage segment with an installation tool as described above, the bridge provides one or more contact surfaces for slider elements of such an installation tool. These contact surfaces can be disposed centrally in the axial direction (e.g., only one single, centrally disposed contact surface) or distributed in the axial direction (e.g., two axially opposing contact surfaces). Due to the contact surfaces the installation tool is in engagement with the cage segments and in this way can secure the individual cage segments, and thus the rolling elements, against the bearing ring. A one-part cage can thus be dispensed with.

According to one embodiment, the contact surfaces are disposed radially outside and/or radially inside the pitch circle diameter of the rolling elements. As is described above, in their end position the slider elements are disposed in the free space radially outside the pitch circle diameter between two rolling elements, the contact surface of the cage segment, and the raceway of the outer ring, or in the free space radially inside the pitch circle diameter between two rolling elements, the contact surface of the cage segment, and the raceway of the inner ring. In order to make possible an interaction of the slider elements with the cage segments, the contact surfaces are therefore also disposed radially outside or radially inside the pitch circle diameter of the rolling elements. The guide surfaces also then may comprise the rolling elements, accordingly outside or inside the pitch circle diameter. The contact surfaces are preferably disposed both radially inside and radially outside the pitch circle diameter of the rolling elements, since in this way the cage segments can be used flexibly for the installation of both the bearing inner ring and the bearing outer ring.

According to a further embodiment, the contact surfaces are configured as a recess open toward the outer ring and/or the inner ring, which recess is elongated in the circumferential direction. Due to a circumferential clearance of the rolling elements and of the cage segments, an offset of the cage segments with respect to the slider elements can arise. However, since the contact surfaces have a circumferential extension, the slider elements can also be pushed into the contact surfaces even in the event of an offset of the cage segments. Due to the circumferential extension of the contact surfaces, there is no need to make the slider elements be displaceable in the circumferential direction. However, in order to facilitate installation of the installation tool or of the slider elements, a displacement possibility can be provided of the slider elements relative to the ring in the circumferential direction.

The contact surfaces can have a circumferential width that ensures a circumferential clearance of the slider element relative to the contact surface. The circumferential clearance of the rolling elements preferably corresponds to 0.5 to 1.5 times the circumferential clearance of the rolling elements.

In order to ensure that the cage segments cannot be arbitrarily displaced circumferentially with respect to the slider elements, or the cage segments lose the contact to the slider elements, the contact surfaces can include a stop in the circumferential direction. This stop can be provided in both circumferential directions. Due to the stop, the movement of the slider elements is limited in the circumferential direction as soon as they are pushed into the cage segments.

According to another aspect, a cage segment for a rolling-element bearing having a plurality of rolling elements comprises at least one bridge having a first end and a second end spaced in an axial direction and a first side and a second side spaced in a circumferential direction and an outer edge and an inner edge spaced in a radial direction, the cage segment further including a first plate extending perpendicularly from the first end of the at least one bridge and a second plate extending perpendicularly from the second end of the at least one bridge. The first side is configured to contact a first rolling element of the plurality of rolling elements and the second side is configured to contact a second rolling element of the plurality of rolling elements and maintain a spacing between the first and second rolling elements. Also, the radial inner or outer edge includes at least one axial channel having channel walls projecting radially and circumferentially from the radial outer edge.

According to another aspect a cage segment for a rolling-element bearing having a plurality of rollers includes a first bridge and a second bridge, each of the first and second bridges having a first end and a second end spaced in an axial direction and a first side and a second side spaced in a circumferential direction and an outer edge and an inner edge spaced in a radial direction, the segment further including a first plate connecting the first end of the first bridge to the first end of the second bridge and a second plate connecting the second end of the first bridge to the second end of the second bridge. The second side of the first bridge and the first side of the second bridge define a pocket for receiving one of the plurality of rollers, and the radial outer edge includes at least one axial channel having channel walls projecting radially and circumferentially from the radial outer edge. Outer surfaces of the channel walls are curved to form guide surfaces for the plurality of rollers, and bottoms of the channels are radially spaced from the outer edges of the cage segments.

According to a further aspect, a method is proposed for installing a bearing including an inner ring and an outer ring. The method includes the steps: positioning of the inner ring, positioning of the rolling elements and cage segments on the inner ring, positioning of the above-described installation tool on the inner ring, displacing of the slider elements of the installation tool into their respective end position, so that the slider elements are each disposed between two rolling elements and against a contact surface of a wall of a cage segment, which wall is disposed between the two rolling elements, in order to limit a radial mobility of the rolling elements with respect to the bearing ring (i.e., to prevent a falling-out of the rolling elements), inserting of the inner ring including the installation tool and the rolling elements onto a sleeve or shaft and/or into the outer ring, and removal of the installation tool. The sleeve or shaft can in particular be an element of a hub unit of a turbine.

In order to again remove the inner ring from the sleeve or shaft, the installation tool can be attached again to the inner ring, and the slider elements can be displaced in order to hold the rolling elements against the inner ring. The inner ring together with the rolling elements and the installation tool can then be removed.

Due to the use of the installation tool it is possible to avoid using a one-part cage, since the slider elements assume the function of a bearing cage, so that the rolling elements are secured between the slider elements and the bearing ring. The bearing can therefore be used with individual cage segments, into which the slider elements of the installation tool engage. Due to such an installation method it is therefore possible to move a bearing ring as a whole, including the rolling elements, without a one-part cage. This is required in particular for applications including large rolling-element bearings, such as, for example, for turbines, as is described above.

According to a further aspect, a bearing is proposed including an inner ring and an outer ring, between which rolling elements are disposed that are held by cage segments. The bearing can be installed in particular by the above-described installation method.

According to a further aspect, a hub unit for a turbine is disclosed including two tapered roller bearings that are disposed in a back-to-back arrangement, wherein the tapered roller bearings each include an inner ring and an outer ring, between which inner ring and outer ring tapered rollers are respectively disposed that are held by cage segments. At least one of the tapered roller bearings can be installed by the installation method described above, whereby no one-part cage is required. Instead, the bearing including cage segments can be used, as is described in more detail above.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
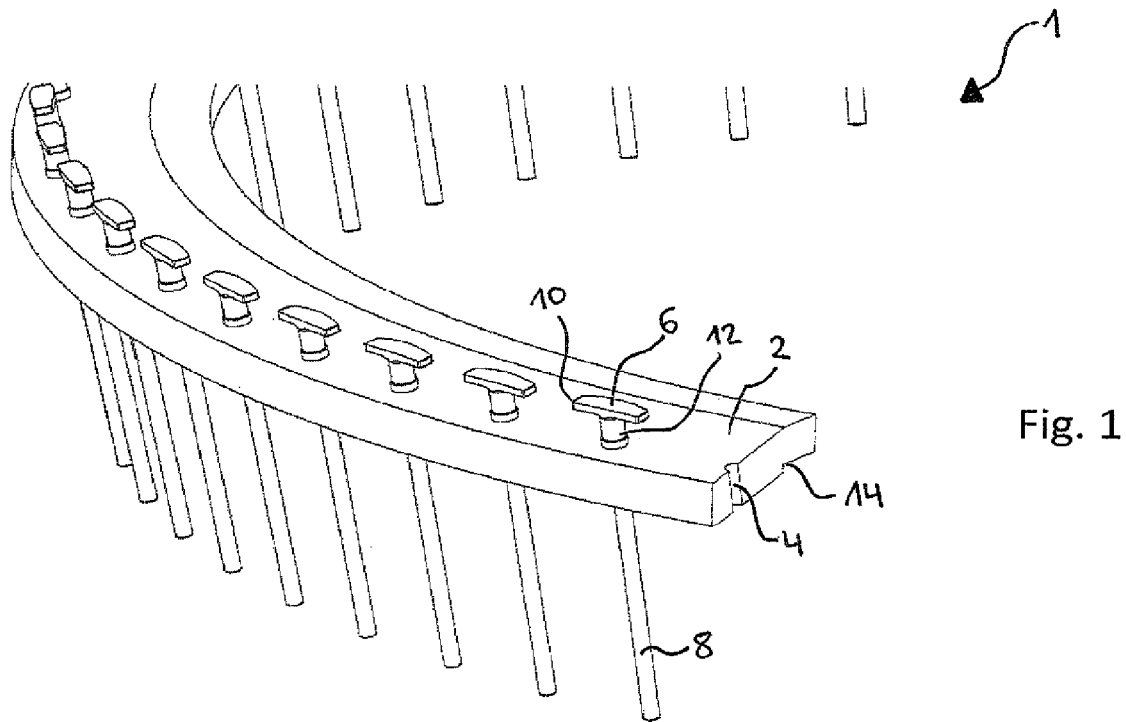
FIG. 1 is a perspective view of an installation tool according to an embodiment of the present disclosure

FIG. 1 shows a perspective view of an installation tool 1. The installation tool 1 includes a ring 2. Through-openings 4 are provided in the ring 2 through which slider elements 6 can be pushed. The slider elements 6 are comprised of a first tubular (or cylindrical) section 8 that is pushed through the through-openings 4, a retaining grip 10, and a second tubular (or cylindrical) section 12 to which the retaining grip 10 is attached. The second tubular section 12 preferably has a larger diameter than the through-openings 4, so that the insertion depth of the slider elements 6 is thereby limited. The end position of the slider elements 6 is thereby defined by contact between the second tubular section and the ring 2.

In order to attach the installation tool 1 to a bearing ring, the ring 2 includes a centering means 14. The centering means 14, which is configured as an edge (or shoulder), serves to arrange the installation tool 1 on the bearing ring, the centering means 14 abutting against an outer side of the bearing ring, for example, a guide flange.

Although in the Figures the installation tool is configured such that it is arrangeable on an inner ring of a bearing, the installation tool 1 can also be configured such that it can be connected to an outer ring of a bearing.

Figure 2:
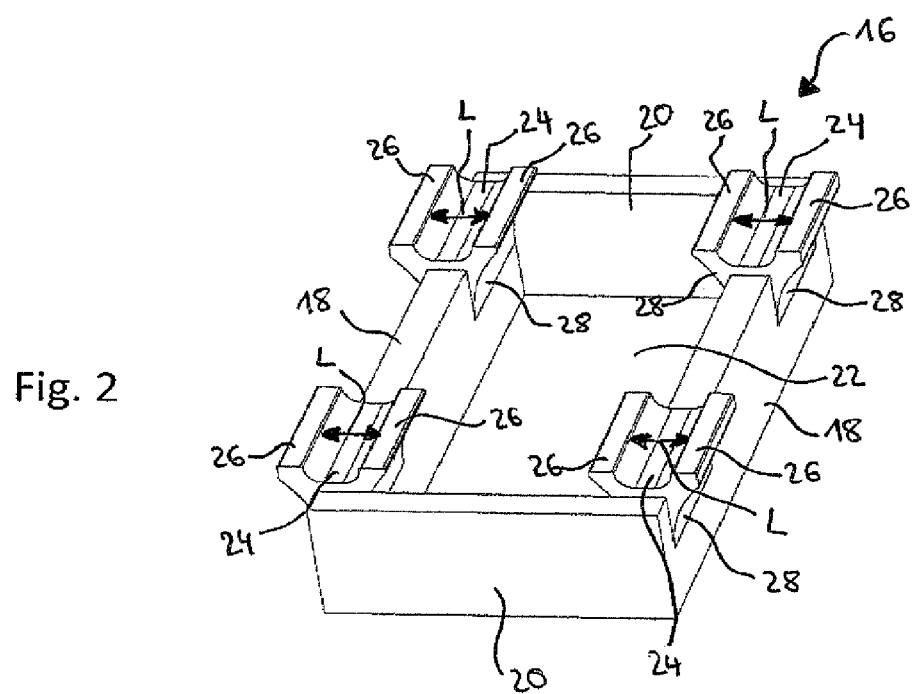
FIG. 2 is a perspective detail view of a cage segment for use with the installation tool of FIG. 1.

If the installation tool 1 is disposed on a bearing ring, it interacts with a cage segment 16 as is depicted in FIG. 2. Such a cage segment 16 includes two bridges 18 that are connected at their respective ends to a connecting or base plate 20. Between the bridges 18 and the connecting plates 20, a pocket 22 for receiving a rolling element, in particular a tapered roller, is respectively formed. With the cage segments 16 shown here, for example, each second rolling element can be received in such a cage segment.

In order to be able to bring the slider elements into contact with the cage segments 16, the cage segments 16 include contact surfaces 24. These contact surfaces 24 each have an extension L in the circumferential direction, each of which extension L is bounded by a stop surface 26. The stop surface 26 serves to hold the slider elements inside the contact surface 24. Due to the extension L it is possible to compensate for a clearance of the rolling elements for the slider elements 6, since the slider elements 6 can move between the two stop surfaces. The contact surfaces 24 include guide surfaces 28 curved toward the rolling elements. The rolling elements can abut against these.

Figure 3:
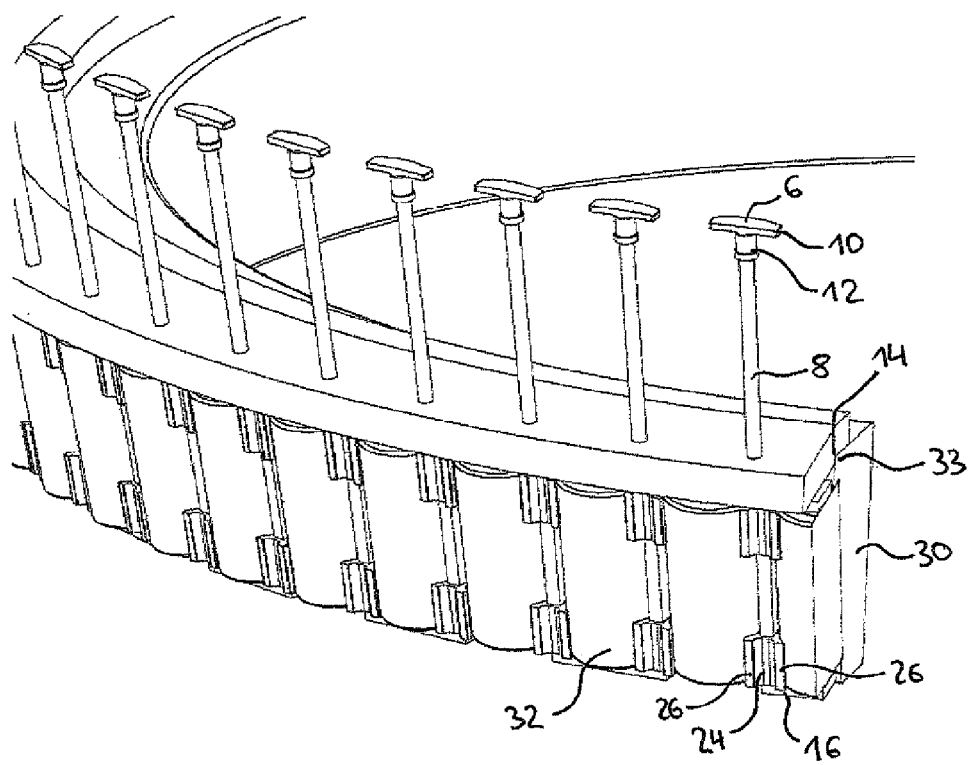
FIG. 3 is a perspective view of an arrangement of the installation tool and of a bearing ring.
Figure 4:
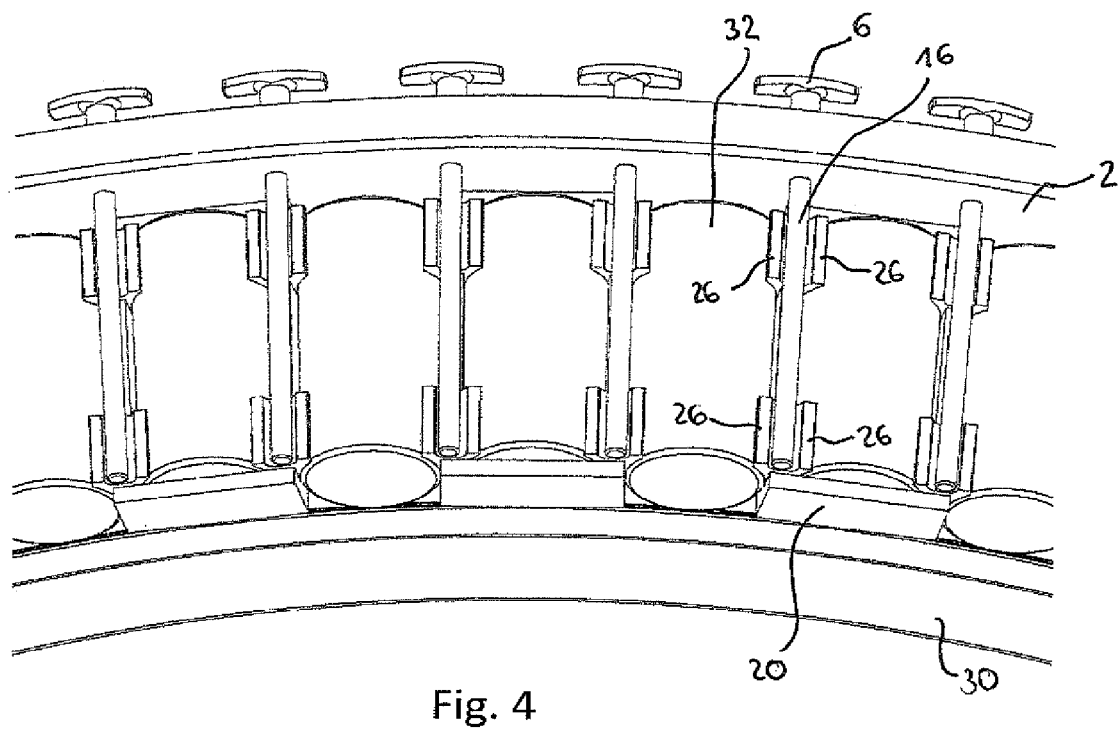
FIG. 4 is a further perspective view of an arrangement of the installation tool and of a bearing ring.

FIGS. 3 and 4 show perspective views of an installation tool 1 that is disposed on a bearing ring 30. In this case the bearing ring 30 is an inner ring of a bearing. The inner ring 30 is provided with rolling elements 32. In the exemplary embodiment shown in FIG. 3, the installation tool 1 is disposed on the bearing ring 30, wherein the slider elements 6 are located in their initial position. In FIG. 4 the slider elements 6 are located in their end position. As can be seen here, in their end position the slider elements 6 are each disposed between two rolling elements 32 of the bearing ring 30. The rolling elements 32 are spaced by cage segments 16. As described above, the cage segments 16 are configured such that a cage-type segment 16 is disposed around every second rolling element 32, wherein a base plate 20 connects two walls or bridges 18 of the cage segment 16. As shown in FIG. 3, the centering means 14 of the installation tool 1 abuts against a guide flange 33 of the inner ring 30.

In their end position the slider elements 6 are disposed over a pitch circle diameter of the rolling elements 32 and are in contact with the contact surfaces 24 of the cage segments 16. In this way the slider elements 6 are configured to hold the rolling elements 32 against the bearing ring 30 in their end position. Due to the use of the installation tool 1, it is possible to dispense with a one-part cage and instead use cage segments 16 as shown here. Since the installation tool 1 assumes the function of a cage and secures the rolling elements 32 against the bearing ring 30, it is possible to move the bearing ring 30 with the rolling elements 32 without the rolling elements 32 falling out.

An installation process of a bearing ring 30 using the installation tool 1 is now described with reference to FIGS. 5 to 7.

The installation shown here of the bearing ring 30 is the installation of an inner ring 30 onto a sleeve or shaft of a hub unit 34 of a turbine. The hub unit 34 includes two tapered roller bearings 36, 38 that are disposed in a back-to-back arrangement. Here the tapered roller bearings 36, 38 are only installed onto the hub unit 34 from one side, namely from the side of the tapered roller bearing 38 outward.

The tapered roller bearing 36 includes an inner ring 40 that is pushed onto the sleeve or shaft 42. During the installation of the tapered roller bearing 36, the rolling elements 44 can be easily arranged on the inner ring 40, since due to the back-to-back arrangement the rolling elements 44 cannot fall downward. An outer ring 46 is then attached to the rolling-element bearing 36. A housing 48 can then be attached in order to protect the bearing.

In order to now install the bearing 38, it is necessary to rotate the hub unit 34, which is difficult to carry out due to the size of the hub unit 34 of a plurality of meters. Alternatively the bearing 38 also must also be installed from above, like the bearing 36. However, since the rolling elements 32 cannot be attached to the bearing inner ring 30 in order to insert the bearing ring 30 into the outer ring 50, since in this case due to the force of gravity the rolling elements would fall out, it has been necessary up to now to use a one-part cage in order to hold the rolling elements 32 against the bearing ring 30. However, this can be avoided due to the installation tool 1.

Figure 5:
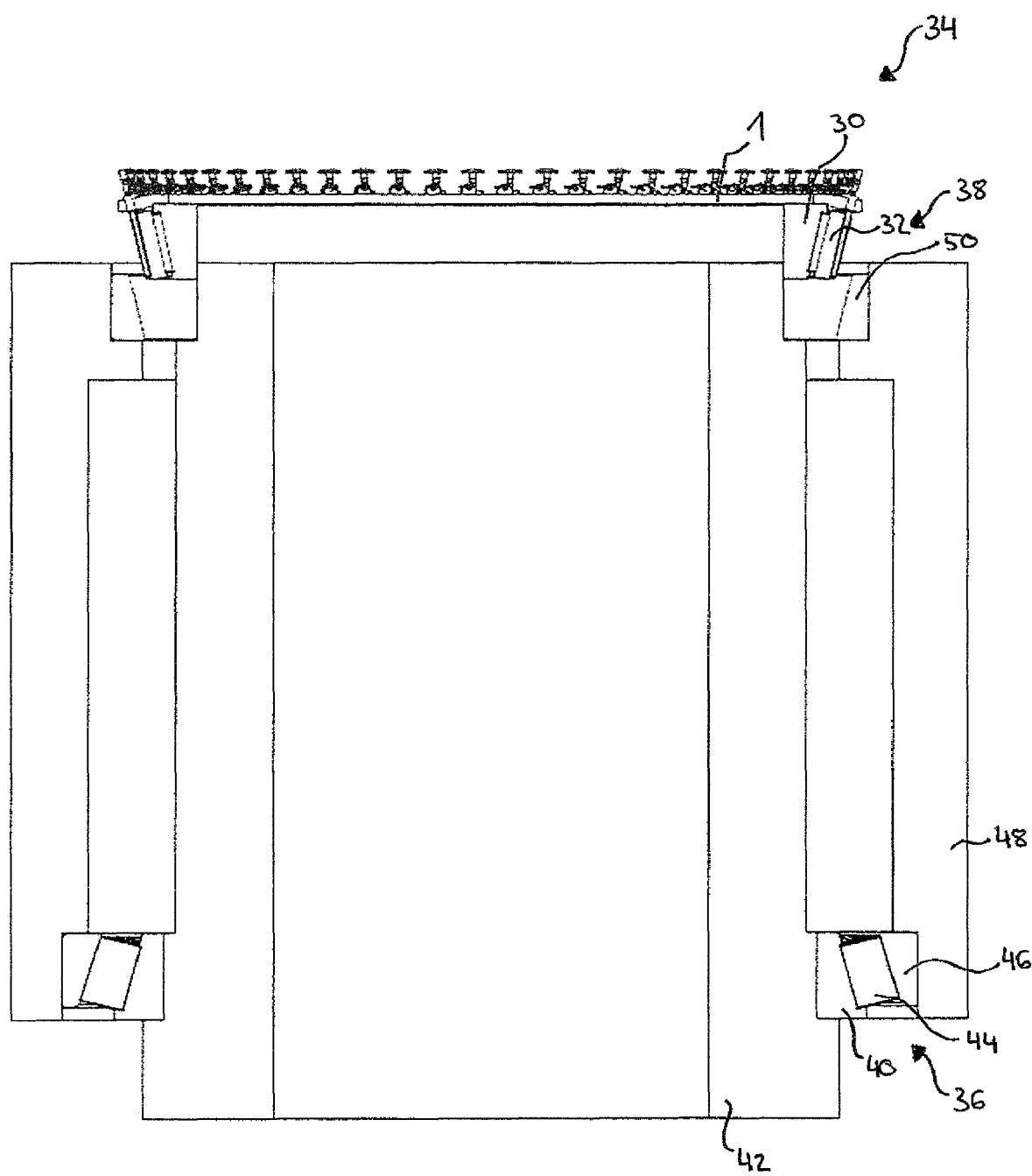
FIG. 5 is a sectional view of a hub unit of a turbine with an installation tool according to the present disclosure attached.
Figure 6:
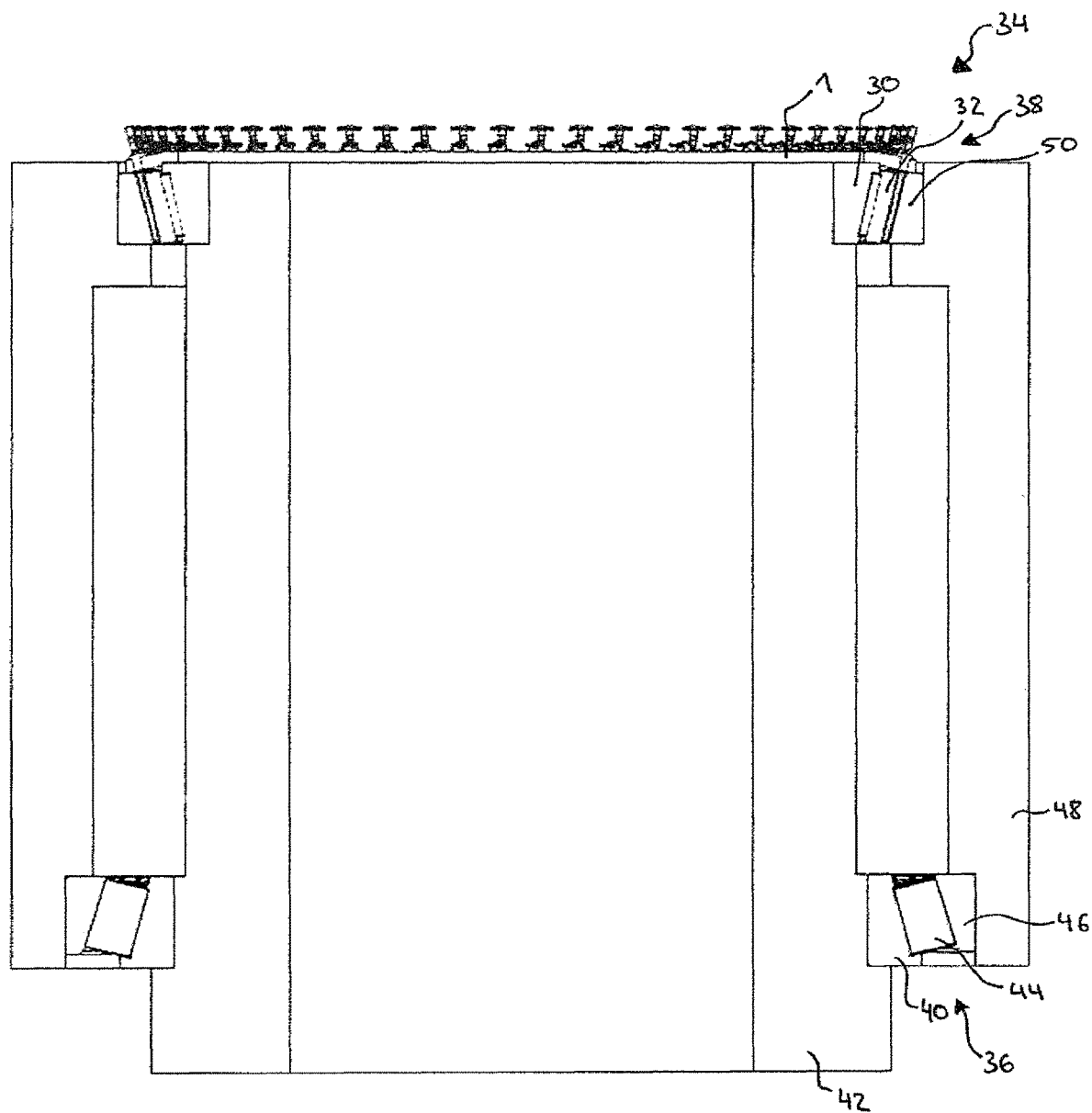
FIG. 6 is a sectional view of the hub unit of FIG. 5 with the bearing inner ring installed.
Figure 7:
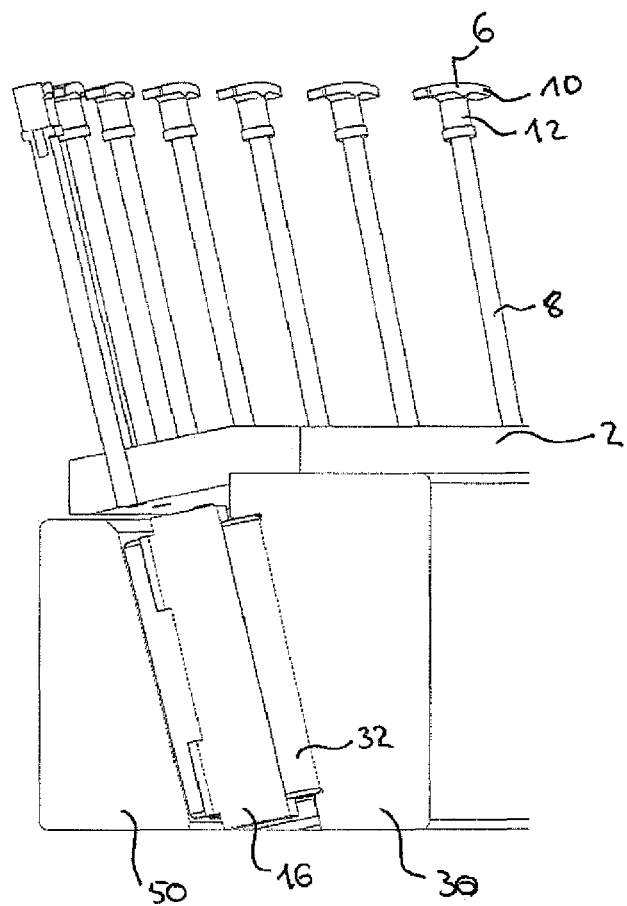
FIG. 7 is a perspective view of the detail of the hub unit of FIG. 5 including pulled-out slider elements.

As shown in FIGS. 5 to 7, the installation tool 1 is placed on the bearing ring 30, and the slider elements 6 are displaced into their end position. Due to this positioning of the installation tool 1, the rolling elements 32 are held against the bearing ring 30, as is described with reference to FIGS. 1 to 4. This module, comprised of the installation tool 1, the bearing inner ring 30, the cage segments 16, and the rolling elements 32, can now be easily pushed onto the sleeve 42. The bearing outer ring 50 can thereby already be disposed, as depicted in FIG. 5.

As shown in FIG. 6, the bearing inner ring 30 can be pushed onto sleeve 42 as a compact module including the rolling elements 32 and the installation tool 1.

As soon as the bearing rings 30, 50 and the rolling elements 32 are correctly positioned, the installation tool 1 can be removed again. This is depicted in FIG. 7, wherein it is shown how the slider elements 6 are pulled out from the assembled bearing assembly. After the pulling out of the slider elements 6, the installation tool 1 can be removed again in a simple manner.

Due to the installation tool shown here a simple installation of a bearing ring including rolling elements is possible without the use of a one-part cage.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing installation tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Installation tool
2 Ring
4 Through-opening/receptacle
6 Slider element
8 First tubular section
10 Retaining grip
12 Second tubular section
14 Centering means
16 Cage segment
18 Bridge
20 Connecting/base plate
22 Pocket
24 Contact surface
26 Stop
28 Guide surface
30 Inner ring
32 Rolling element
33 Guide flange
34 Hub unit
36 Tapered roller bearing
38 Tapered roller bearing
40 Inner ring
42 Sleeve/shaft
44 Rolling element
46 Outer ring
48 Housing
50 Outer ring
L Extension

What is claimed is:

1. A cage segment for a rolling-element bearing having a plurality of rolling elements, the cage segment comprising:
    a first bridge and a second bridge each having a first end and a second end spaced in an axial direction and a first side and a second side spaced in a circumferential direction and an outer edge and an inner edge spaced in a radial direction, and
    a first plate extending perpendicularly from the first end of the first bridge to the first end of the second bridge and
    a second plate extending perpendicularly from the second end of the first bridge to the second end of the second bridge,
    wherein the first side of the first bridge is configured to contact a first rolling element of the plurality of rolling elements and the second side of the first bridge is configured to contact a second rolling element of the plurality of rolling elements and maintain a spacing between the first and second rolling elements,
    wherein the first side of the first bridge defines a first circumferential end of the cage segment and the second side of the second bridge defines a second circumferential end of the cage segment, and
    wherein the radial outer edge of the first bridge and the radial outer edge of the second bridge each include at least one axial channel having channel walls or wherein the radially inner edge of the first bridge and the radial inner edge of the second bridge each include at least one axial channel having channel walls.

2. The cage segment according to claim 1, wherein the first bridge and the second bridge define a pocket for receiving the second rolling element.

3. The cage segment according to claim 2, wherein the at least one axial channel comprises a first axial channel axially spaced from a second axial channel.

4. The cage segment according to claim 3, wherein outer surfaces of the channel walls define guide surfaces for the plurality of rolling elements.

5. The cage segment according to claim 4, wherein the rolling elements are rollers.

6. The cage segment according to claim 3, wherein the at least one axial channel is substantially U-shaped.

7. The cage segment according to claim 4, wherein a spacing from the outer surface of the channel wall of the first bridge to the outer surface of the channel wall of the second bridge is less than a spacing between the first bridge and the second bridge.

8. An assembly comprising:
    a plurality of the cage segment according to claim 2 and the first rolling element and the second rolling element.

9. The cage segment according to claim 1, wherein the channel walls project radially from the radial outer edge or the channel walls project radially from the radially inner edge.

10. The cage segment according to claim 1, wherein the channel walls project radially from the radial outer edge.

11. The cage segment according to claim 1, wherein the channel walls project radially and circumferentially from the radial outer edge or the channel walls project radially and circumferentially from the radially inner edge.

12. The cage segment according to claim 1, wherein the channel walls project radially and circumferentially from the radial outer edge.

13. The cage segment according to claim 1, wherein the first side of the second bridge is configured to contact the second rolling element of the plurality of rolling elements.

14. The cage segment according to claim 1, wherein the channel walls of the at least one axial channel of the first bridge include a first channel wall circumferentially spaced from a second channel wall, wherein the first channel wall extends in a direction circumferentially away from the second bridge and the second channel wall extends in a direction circumferentially toward the second bridge.

15. The cage segment according to claim 14, wherein the first side of the second bridge is configured to contact the second rolling element of the plurality of rolling elements.

16. The cage segment according to claim 15, wherein the first channel wall includes a curved side facing away from the second bridge configured to guide the first rolling element of the plurality of rolling elements.

17. A cage segment for a rolling-element bearing having a plurality of rollers, the cage segment comprising:
a first bridge and a second bridge, each of the first and second bridges having a first end and a second end spaced in an axial direction and a first side and a second side spaced in a circumferential direction and an outer edge and an inner edge spaced in a radial direction, and
a first plate connecting the first end of the first bridge to the first end of the second bridge and a second plate connecting the second end of the first bridge to the second end of the second bridge,
wherein the first side of the first bridge defines a first circumferential end of the cage segment and the second side of the second bridge defines a second circumferential end of the cage segment,
wherein the second side of the first bridge and the first side of the second bridge define a pocket for receiving one of the plurality of rollers,
wherein each radial outer edge includes a pair of walls projecting radially and circumferentially from the radial outer edge, facing inner surfaces of each pair of walls defining a channel and outer surfaces of each pair of walls being
curved to form guide surfaces for the plurality of rollers, and
wherein bottoms of the channels are radially spaced from the outer edges of the cage segments.

18. The cage segment according to claim 17, wherein the at least one channel comprises a first channel axially spaced from a second channel.

19. An assembly comprising the cage segment according to claim 18 and a roller in the pocket.

* * * * *